(12) United States Patent
Morales et al.

(10) Patent No.: US 10,858,577 B2
(45) Date of Patent: Dec. 8, 2020

(54) PRE-FLUSH FOR OIL FOAMERS

(71) Applicants: Rosanel Morales, Houston, TX (US);
Lirio Quintero, Houston, TX (US);
Scott Eric Lehrer, The Woodlands, TX (US)

(72) Inventors: Rosanel Morales, Houston, TX (US);
Lirio Quintero, Houston, TX (US);
Scott Eric Lehrer, The Woodlands, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/171,684

(22) Filed: Oct. 26, 2018

(65) Prior Publication Data
US 2019/0144737 A1  May 16, 2019

Related U.S. Application Data

(60) Provisional application No. 62/585,134, filed on Nov. 13, 2017.

(51) Int. Cl.
| C09K 8/594 | (2006.01) |
| E21B 43/16 | (2006.01) |
| C09K 8/584 | (2006.01) |
| E21B 43/12 | (2006.01) |
| C09K 8/588 | (2006.01) |

(52) U.S. Cl.
CPC ............ *C09K 8/594* (2013.01); *C09K 8/584* (2013.01); *C09K 8/588* (2013.01); *E21B 43/122* (2013.01); *E21B 43/16* (2013.01)

(58) Field of Classification Search
CPC ........ C09K 8/594; C09K 8/584; C09K 8/588; E21B 43/122; E21B 43/16
USPC ....... 166/309, 311, 312, 310, 369, 371, 372, 166/370
See application file for complete search history.

(56) References Cited

U.S. PATENT DOCUMENTS

| 4,755,230 A | 7/1988 | Ashton et al. |
| 4,813,482 A | 3/1989 | Walton |
| 5,484,488 A | 1/1996 | Hart et al. |
| 8,091,646 B2 | 1/2012 | Quintero et al. |
| 8,579,035 B2 | 11/2013 | Lehrer et al. |
| 2007/0289742 A1 | 12/2007 | Nguyen |
| 2011/0024131 A1* | 2/2011 | Lehrer .................. C09K 8/584 166/372 |
| 2012/0125620 A1 | 5/2012 | Nguyen et al. |

(Continued)

FOREIGN PATENT DOCUMENTS

WO     2006037959 A1    4/2006

OTHER PUBLICATIONS

International Search Report for International Application No. PCT/US2018/056525, International Filing Date Oct. 18, 2018, dated Apr. 11, 2019, 3 pages.

(Continued)

*Primary Examiner* — Angela M DiTrani Leff
(74) *Attorney, Agent, or Firm* — Cantor Colburn LLP

(57) ABSTRACT

A method of enhancing oil or gas production comprises injecting into a well penetrating a subterranean formation a pre-flush fluid to increase water wettability of the well, the subterranean formation, a flowline, or a combination comprising at least one of the foregoing; and injecting into the well a foamer composition.

16 Claims, 1 Drawing Sheet

(56) References Cited

U.S. PATENT DOCUMENTS

2014/0224492 A1    8/2014  Weaver et al.
2015/0218920 A1*   8/2015  Qunitero .................. E21B 21/00
                                                            166/300
2018/0079951 A1    3/2018  Quintero et al.

OTHER PUBLICATIONS

Written Opinion for International Application No. PCT/US2018/056525, International Filing Date Oct. 18, 2018, dated Apr. 11, 2019, 6 pages.

\* cited by examiner

PRE-FLUSH FOR OIL FOAMERS

CROSS-REFERENCE TO RELATED APPLICATIONS

The present application claims priority from U.S. Provisional Patent Application No. 62/585,134, filed Nov. 13, 2017. The contents of the priority application are hereby incorporated by reference in their entirety.

BACKGROUND

In many wells, the inherent formation pressure is high enough for the oil or gas to flow to the surface. However, with continued production, the bottomhole pressure can reduce over time. If the pressure is not sufficient, liquids can begin to build up in the tubing and flowline instead of flowing out of the well. This is referred to as liquid loading. Liquid loading can impose a backpressure on the formation, which in turn can significantly reduce the productivity of the well or "kill" the well so that it does not flow at all. When liquid loading occurs, artificial methods of lifting the oil from the formation to the surface are usually employed.

Common artificial lifting methods include gas/plunger lifts, surface pump jacks, and electrical submersible pumps. These solutions are effective but can be capital-intensive. Surfactant based foamers offer a cost-effective alternative solution. These foamers can help remove liquid from a well by reducing the minimum velocity required to unload the liquid.

While various foamers have been proposed to treat gas wells, methods that can further improve the performance of foamers in reducing liquid loading are continuously sought.

BRIEF DESCRIPTION

A method of enhancing oil or gas production comprises injecting into a well penetrating a subterranean formation a pre-flush fluid to increase water wettability of the well, the subterranean formation, a flowline, or a combination comprising at least one of the foregoing; and injecting into the well a foamer composition.

A method of mitigating liquid loading in an oil well penetrating a subterranean formation comprises injecting into the oil well a pre-flush fluid to increase water wettability of the oil well, the subterranean formation, a flowline, or a combination comprising at least one of the foregoing, the pre-flush fluid being a single phase fluid, a microemulsion, or a combination thereof; injecting a foamer composition into the oil well subsequent to injecting the pre-flush fluid; and injecting a lift gas into the well or using a naturally occurring gas in the well to convey a wellbore fluid out of the well.

BRIEF DESCRIPTION OF THE DRAWINGS

The following descriptions should not be considered limiting in any way. With reference to the accompanying drawings, like elements are numbered alike.

DETAILED DESCRIPTION

The inventors hereof have found that pre-flush fluids having a very-low interfacial tension and high water wettability can be used to improve the efficiency of foamers that are typically used for enhancing gas or oil production and mitigation liquid loading. The improved efficiency includes, but is not limited to, broadening the applicability of the conventional foamers to the wellbore fluids to be treated in terms of API gravity and composition. For example, without a pre-flush fluid, a foamer composition may only be effective to lift wellbore fluids having an API gravity of less than or equal to 45. By using a pre-flush fluid as disclosed herein, the same foamer composition can be effective to lift wellbore fluids having an API gravity greater than 45 as well as wellbore fluids having an API gravity of less than or equal to 45. As another example, without a pre-flush fluid, a foamer composition may only be effective to lift wellbore fluids having a water cut of less than 40%, and by using a pre-flush fluid as disclosed herein, the same foamer composition can be effective to lift wellbore fluids having a water cut of equal to or less than 60%. Without wishing to be bound by theory, it is believed that the improved efficiency is achieved by tuning the water wettability of the well, the subterranean formation, a flowline, or a combination comprising at least one of the foregoing by using the pre-flush fluids.

Figure 1:
FIG. 1 shows a water droplet on an untreated surface.
Figure 2:
FIG. 2 shows a water droplet on a surfaced treated with an oil-based drilling fluid.
Figure 3:
FIG. 3 shows a water droplet on a surface treated with a pre-flush fluid according to an embodiment of the disclosure.

The pre-fluid fluid is a microemulsion, a single phase fluid, or a combination comprising at least one of the foregoing. The wettability of a surface is a characteristic that affects fluid movement. The contact angle of a water droplet on a surface, before and after exposure to different fluids, is an important consideration in evaluating a pre-flush fluid. When a pre-flush fluid as described herein contacts a solid surface, the interfacial free energy of the liquid-solid interface decreases, which results in a reduction of the contact angle between the solid surface and the pre-flush fluid. FIG. 1 shows a water droplet on an untreated surface, FIG. 2 shows a water droplet on a surface treated with an oil-based drilling fluid, and FIG. 3 shows a water droplet on a surface treated with a pre-flush fluid according to the disclosure. Measurements show a contact angle of 0° after the solid surface is treated with the pre-flush fluid, compared to a contact angle of 42° after the solid surface is treated with an oil-based drilling fluid, and a contact angle of 25° for the baseline measurement. The results demonstrate that a pre-flush fluid according to the disclosure is effective to increase the water wettability of the well, formation, flowline, or a combination comprising at least one of the foregoing. In an embodiment, the contact angle of water with a solid surface such as a well, formation, flowline, can be decreased by at least 40%, at least 30%, at least 20%, or at least 10% after the pre-flush fluid is injected downhole. The increased water wettability improves the efficiency of foamer compositions in lifting wellbore fluids particularly crude oils out of the well.

In an embodiment, the pre-flush fluids are single phase fluids comprising a solvent, a surfactant, and a co-solvent. Suitable surfactants for the pre-flush fluids include nonionic surfactants having an HLB between about 9 and about 14, for instance alkoxylated surfactants, such as alkoxylated alcohols, where the alkoxy groups are ethoxy groups, propoxy groups or combinations thereof. Other nonionic surfactants include polymeric alkoxylates, polyglucosides, sorbitan esters, amine oxide, and alkanolamides. Surfactants for the pre-flush fluids can also include anionic surfactants such as oxyalkylated ether sulfates, alkyl aryl sulfates, disulfonates, sulfosuccinates, sulfonates (e.g. sulfonated amines and salts thereof), and carboxylates, and combinations thereof, again where the alkoxy groups are ethoxy groups, propoxy groups or mixtures thereof. Cationic surfactants can also be used. Other suitable surfactants for the pre-flush fluids include gemini surfactants, betaines, amino-acids such as cocoyl glutamate, cationic surfactants, such as quaternary ammonium compounds (e.g. polyglycol ether ammonium methyl chloride).

The solvents for the pre-flush fluids include aromatic solvents and aliphatic solvents, or a combination thereof. Aliphatic solvents can be $C_{6-15}$ aliphatic solvents. Aromatic solvents can be $C_{6-12}$ aromatic solvents such as aromatic solvents composed of isomers of $C_9H_{12}$; heavy aromatic solvent primarily composed of $C_{10}$ aromatic (CAS number 64742-94-5); and the like. Other exemplary solvents for the pre-flush fluids include terpenes, ionic liquids, synthetic solvents such as methyl ester solvents and solvents produced by metathesis catalyst technology.

Co-solvents for the pre-flush fluids include glycol ethers, which can include ethylene glycol mono-butyl ether, dipropylene glycol mono-methyl ether, propylene glycol ethers, methyl 2-pyrrolidone, as well as other co-solvents such as methanol, isopropyl alcohol, butanol, pentanol, hexanol, isooctyl alcohol and their isomers, $C_{1-8}$ alcohol blends, and the like, and combinations thereof.

By using appropriate surfactants, solvents, and co-solvents, and appropriate amounts of these surfactant, solvents, and co-solvents, the components may be all combined together into a stable, single phase fluid. By "stable" is meant that the single phase fluid does not separate into different phases over time upon standing, handling, and/or use. Once the single phase fluid is introduced into the wellbore and contacts the well, the formation, or the wellbore fluids, then it is acceptable, although not necessary, for the components of the fluids to phase separate.

The pre-flush fluids contain about 5 to about 25 wt % of a surfactant, 5 to about 40 wt % of a solvent, and about 5 to about 30 wt % of a co-solvent, each based on the total weight of the pre-flush fluids. Alternatively, pre-flush fluids contain about 7 to about 15 wt % of a surfactant, about 10 to about 20 wt % of a solvent, and about 10 to about 20 wt % of co-solvent, each based on the total weight of the pre-flush fluids. In a specific embodiment, the pre-flush fluids comprise about 5 to about 40 wt % of an aromatic solvent; about 5 to about 25 wt % of the surfactant which comprises a blend of polyoxyalkylene sulfate and alcohol ethoxylate; and about 5 to about 30 wt % of the co-solvent which comprises glycol ether, an aliphatic alcohol, or a combination thereof; and about 40 wt % to about 60 wt % of a brine, each based on a total weight of the pre-flush fluid, provided that the total weight percent of the components in the pre-flush fluids do not exceed 100%.

In another embodiment, the pre-flush fluids are microemulsions. As used herein, a microemulsion is a thermodynamically-stable translucent fluid comprising a non-polar oil phase, a water (or brine) phase, and surfactants. Microemulsions differ from ordinary emulsions in that microemulsions can be prepared with little or no input of mechanical energy. The microemulsions as disclosed herein can be macroscopically homogeneous.

The microemulsions may be formed prior to injecting into a well, or the microemulsions may be formed in situ in the well incorporating non-polar and polar fluids and particles already present in the well or formation.

In one non-limiting embodiment, the in situ-formed emulsion may be made using a surfactant, a polar fluid and a relatively small amount of non-polar fluid and/or fluid of intermediate polarity. It has been found that it is sometimes helpful when forming an in situ emulsion downhole to inject a water solution of surfactant already containing some solubilized oil (in a non-restrictive example only from about 2 to about 40% or so). In other words, the injected fluid may be considered as a single phase microemulsion containing only 2% of oil, and then once in the reservoir this fluid will solubilize the oil which is in situ and thus becomes another single phase microemulsion containing much more oil, in a non-limiting instance, about 70 or 80%.

Surfactants suitable for creating microemulsions including the in situ microemulsions include non-ionic, anionic, cationic and amphoteric surfactants and in particular, blends thereof. Co-solvents or co-surfactants such as alcohols are optional additives used in the microemulsion formulation. Suitable nonionic surfactants include alkyl polyglycosides, sorbitan esters, polyglycol esters, methyl glucoside esters, or alcohol ethoxylates. Suitable anionic surfactants include alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates, or combinations comprising at least one of the foregoing. Suitable cationic surfactants include arginine methyl esters, alkanolamines and alkylenediamines. In an embodiment at least two surfactants in a blend may be used to create microemulsions, including in-situ generated single phase microemulsions. Suitable surfactants may also include so-called extended surfactants containing a non-ionic spacer-arm central extension and an ionic or nonionic polar group. The non-ionic spacer-arm central extension may be the result of polypropoxylation, polyethoxylation, or a mixture of the two, in non-limiting embodiments.

In an embodiment, the microemulsions contain a co-surfactant which can be glycol or an alcohol having from about 3 to about 10 carbon atoms or about 3 to about 5 carbon atoms such as propanol, butanol, pentanol in their different isomerization structures. A specific example of a suitable co-surfactant includes butanol. These co-surfactants may be alkoxylated, e.g. ethoxylated and/or propoxylated, although in most cases sufficient ethoxylation should be present to accomplish the purposes of the methods herein. In one non-restrictive embodiment the number of ethoxy units ranges from about 3 to about 15, alternatively from about 6, independently up to about 10.

In an exemplary embodiment, microemulsions include a surfactant blend of polyethoxylated alkyl sulfate and alcohol ethoxylated with 8 or higher EO. (such as those available from Baker Hughes, a GE company, LLC.

In an embodiment, the proportion of non-brine components in the microemulsion is about 15 to about 85 volume %, even about 90 volume %, and in other non-limiting embodiments may range from about 1 to about 20 volume % in a diluted microemulsion, sometimes called micellar solutions, and from about 70 to about 95 volume % in another diluted microemulsion, sometimes called an inverse micellar solution.

Other components that may be included in the pre-flush fluids besides those already discussed include water or brine (including, but not necessarily limited to KCl brines, NaCl brines, $CaCl_2$) brines, $ZnCl_2$ brines, bromide brines, formate brines and the like). For microemulsions, brine can be the polar phase or the polar liquid. In an embodiment, the pre-flush fluids comprise about 30 wt. % to about 80 wt. % or about 35 wt. % to about 70 wt. % or about 40 wt. % to about 60 wt. % of a brine, based on the total weight of the pre-flush fluids.

The contact time between the pre-flush fluid and the well, the formation, or the flowlines can be from about 5 minutes to about 30 minutes. It will be appreciated that the goal is to contact the pre-flush fluid with the well, formation, and flowline in an amount of time that is sufficient to increase the water wettability of the well, formation, and flowline as much as possible.

The pre-flush fluids as disclosed herein can improve the efficiency of foamer compositions in oil lifting, water lifting, or condensate lifting. A foamer composition can include crude oil foamers, aqueous foamers, and condensate foamers. As used herein, a foamer composition refers to a composition that is useful to reduce the surface tension between the lift gas and the wellbore fluid being lifted to the surface and/or create a foam of the lift gas and the wellbore fluid. This decreased surface tension and/or foam formation allows for a decrease in the density of the wellbore fluid which results in an increase in lift efficiency.

Any foamer compositions known in the art can be used. In an embodiment, the foamer compositions are crude oil foamers, such as those described in U.S. Pat. No. 8,579,035, the content of which is incorporated herein by reference in its entirety.

Exemplary foamer compositions include surfactants such as a silicone resin. Silicone resins are highly crosslinked polymeric siloxane systems. The crosslinking is introduced through the incorporation of trifunctional and tetrafunctional silanes with monofunctional or difunctional, or both, monomer units during manufacture of the silicone resin. The ratio of oxygen atoms to silicon atoms is indicative of the level of crosslinking in a particular silicone material. The ratio of oxygen:silicon atoms in the silicone surfactant is at least about 1.1:1 or at least about 1.2:1. Silanes used in the manufacture of silicone resins include monomethyl-, dimethyl-, monophenyl-, diphenyl-, methylphenyl-, monovinyl-, and methylvinyl-chlorosilanes, and tetra-chlorosilane, with the methyl-substituted silanes being most commonly utilized.

One silicone resin useful with the method of the disclosure is marketed under the trade designation DOW CORNING 1250, which is a polytrimethylhydrosilylsiloxane. This resin has a molecular weight of about 5770 and Mn of about 3160.

The foamer compositions can also include a surface that is different from the silicone resin. When the surfactant is a sultaine salt, it preferably has the general formula: $RCONH(CH_2)_mN^+(CH_3)_2CH_2CH(OH)SO_3^-$ wherein R is a hydrocarbon side chain, and m varies from 1-100. The counter ion may be any including $Na^+$, $K^+$ and the like.

When the surfactant is a hydroxy sultaine salt thereof, it preferably has the general formula: $RCONH(CH2)_mN^+(CH_3)_2CH_2CH(OH)CH_2SO_3^-$ where R is hydrocarbon side chain. The counter ion may be any including $Na^+$, $K^+$ and the like.

The hydrocarbon side chains designated as R in the above general formulae are, in some embodiments, aliphatic linear or branched chains having from 2 to 20 carbons. In some embodiments, the side chains are linear alkanes have from 10 to 16 carbons. In one embodiment, the side chain is a lauryl (C12) group.

The surfactants useful for the foamer compositions may also include betaines, organic phosphonates, alkyl sulfonates, and the like. Any surfactant that is compatible with a system including a silicone resin, a diluent as described herein, and optionally a solvent may be used with the method of the disclosure. Surfactants that may have a synergistic effect with the silicone resins are especially desirable.

The foamer compositions can also include a diluent. The diluents may function to decrease the concentration of the silicone resin for easier dispersion within the wellbore. The diluents can also vaporize slowly in the wellbore to facilitate greater foam production. Exemplary diluents include diesel oil, xylenes, toluene, kerosene, gasoline and the like and a combination comprising at least one of the foregoing.

The foamer compositions can include solvents. Suitable solvents include those described herein for the pre-flush fluids. One advantage of using a solvent is that it can be used to mitigate premature vaporization of the diluents. A lower boiling diluent, such as toluene, can be injected with a higher boiling solvent, such as naphtha, resulting in a admixture that can be injected into an oilwell that would be to hot for the use of toluene diluents alone.

In an embodiment, a method for recovering a wellbore fluid such as oil from a well penetrating a subterranean formation includes injecting into the well a pre-flush fluid as described herein; injecting into the well a foamer composition; and conveying a wellbore fluid to the surface.

The pre-flush fluids and the foamer compositions can be used to produce or unload a broad range of wellbore fluids. The wellbore fluids that are produced or unloaded using the methods of the disclosure may have an API gravity of less than or equal to 45 or an API gravity greater than 45 such as 45 to 55. The water cut of the crude oils can be 0-75%, 0-65%, or 5-60%. In an embodiment, the well is an oil well, and the wellbore fluid is a crude oil.

Preferably, the wellbore fluids such as crude oil including those build up in the tubing and flowline are converted into a foam and conveyed to the surface in a foam state. As used herein, a foam means gas surrounded by a thin liquid layer. The gas can be generated downhole or introduced from the surface. The foam treatment can be combined with a gas lift treatment. The method can be used with any gas lift method known to those of ordinary skill in the art of producing oil and/or gas. One gas commonly used as a lift gas with the method of the disclosure is natural gas. Other gases can also be used including air, carbon dioxide, methane, ethane, propane, nitrogen, and mixtures thereof.

The foamer composition and the pre-flush fluid can be applied in batch applications or continuous applications via umbilical, capillary string, an annulus for wells without a packer, or gas lift. For a batch process, a well can be treated with pre-flush fluids then the foamer compositions. For a continuous process, the well can be initially treated with a pre-flush fluid then continuously with a foamer composition. Alternatively the well can be treated with the pre-flush fluid and the foamer composition in an alternating order. The dosage can be optimized to a point where slugging is mitigated and pressures stabilized.

The methods disclosed herein can enhance gas or oil production by increasing oil and gas flow and reducing downtime. The methods also provides an improved solution to liquid loading and enable sustained flow from the well.

EXAMPLES

The foaming tests were conducted using a crude oil sample containing 50 volume percent of a produced oil and 50 volume percent of a produced water at 90° C. The amount of the oil foamer used was 10,000 ppm. The microemulsion contained 18 wt % of a surfactant blend (blend of polyoxyalkylene sulfate and alcohol ethoxylate), 18 wt % of a solvent (aromatic solvent), 13 wt % of a first co-solvent (glycol ether), 1 wt % of a second co-solvent (isooctyl alcohol), and 50 wt % of KCl brine. The amount of the microemulsion used was 5% based on the total volume of the sample.

Comparative Example 1

A crude oil sample was prepared by adding into a prescription bottle 100 mL of produced fluids (50 ml oil and 50 ml water). The components were mixed, and the sample was placed in an oven to increase the temperature of the sample to 90° C.

A laboratory dynamic foam test column was used to evaluate materials for their potential to foam crude oils and reduce oil density. The column was water-jacketed to maintain the system temperature. An O-ring seal and frit were clapped at the bottom of the test column. Nitrogen purge was initiated through the frit until a steady foaming rate was achieved. A flow meter was utilized to keep a flow rate constant. The crude oil sample was poured into the test column using a funnel with tubing to mimic wetting conditions inside the column with the fluids. A desired amount of the oil foamer (by volume) was added to the fluids. Care was taken to avoid contacting the foamer with the column wall. The flow rate was increased to 15 scf/h. The purging of the nitrogen was continued for up to 20 minutes, and the weight of total fluids carry over was recorded. If no fluids were unloaded, the maximum height of the foam reached was recorded.

Example 2

Comparative example 1 was repeated except that a microemulsion (5 vol %) was added to the crude oil sample before the sample was placed in the oven.

The results are summarized in Table 1.

TABLE 1

| | Oil Foamer only (CEx 1) | Microemulsion + Oil foamer (Ex 2) |
|---|---|---|
| Lifted height | 0 ml | 820 ml |

The results indicate that with a pre-flush fluid, the efficiency of oil foamers in oil lifting can be been significantly improved.

Set forth are various embodiments of the disclosure.

Embodiment 1

A method of enhancing oil or gas production, the method comprising: injecting into a well penetrating a subterranean formation a pre-flush fluid to increase water wettability of the well, the subterranean formation, a flowline, or a combination comprising at least one of the foregoing; and injecting into the well a foamer composition.

Embodiment 2

The method of any of the proceeding embodiments, wherein the foamer composition is injected after the pre-flush fluid.

Embodiment 3

The method of any of the proceeding embodiments, wherein the foamer composition contacts the wellbore fluid in the well to decrease the density of the wellbore fluid.

Embodiment 4

The method of any of the proceeding embodiments, further comprising conveying a wellbore fluid out of the well.

Embodiment 5

The method of any of the proceeding embodiments, wherein the wellbore fluid is conveyed out of the well together with a lift gas.

Embodiment 6

The method of any of the proceeding embodiments, wherein the lift gas is injected into the well and comprises air, carbon dioxide, methane, ethane, propane, nitrogen, or a combination comprising at least one of the foregoing.

Embodiment 7

The method of any of the proceeding embodiments, wherein the lift gas is naturally occurring and comprises carbon dioxide, natural gas, or a combination comprising at least one of the foregoing.

Embodiment 8

The method of any of the proceeding embodiments, wherein the wellbore fluid is a crude oil.

Embodiment 9

The method of any of the proceeding embodiments, wherein the wellbore fluid has an API density of less than 45.

Embodiment 10

The method of any of the proceeding embodiments, wherein the wellbore fluid has an API density of 45 to 55.

Embodiment 11

The method of any of the proceeding embodiments, wherein the wellbore fluid has a water cut of equal to or less than 75%.

Embodiment 12

The method of any of the proceeding embodiments, wherein the pre-flush fluid is a single phase fluid, a microemulsion, or a combination thereof.

Embodiment 13

The method of any of the proceeding embodiments, wherein a pre-flush fluid is a single phase fluid comprising a surfactant, a solvent, and a co-solvent.

Embodiment 14

The method of any of the proceeding embodiments, wherein: the surfactant in the single phase fluid comprises: nonionic surfactants having an HLB between about 9 and about 14, anionic surfactants comprising oxyalkylated ether sulfates, alkyl aryl sulfates, disulfonates, sulfosuccinates, sulfonates, carboxylates, or a combination comprising at least one of the foregoing, cationic surfactants, gemini surfactants, betaines, amino-acids, or a combination comprising at least one of the foregoing; the solvent in the single phase fluid comprises an aromatic solvent, aliphatic solvent, or a combination comprising at least one of the foregoing; and the co-solvent in the single phase fluid comprises glycol ethers, methyl 2-pyrrolidone, methanol, isopropyl alcohol, butanol, pentanol, hexanol, isooctyl alcohol and their isomers, blends of $C_{1-8}$ alcohols, or a combination comprising at least one of the foregoing.

Embodiment 15

The method of any of the proceeding embodiments, wherein the pre-flush fluid comprises: about 5 to about 40 wt % of the solvent which comprises an aromatic solvent; about 5 to about 25 wt % of the surfactant which comprises a blend of polyoxyalkylene sulfate and alcohol ethoxylate; about 5 to about 30 wt % of the co-solvent which comprises glycol ether, an aliphatic alcohol, or a combination thereof; and about 40 wt % to about 60 wt % of a brine, each based on a total weight of the pre-flush fluid.

Embodiment 16

The method of any of the proceeding embodiments, wherein the pre-flush fluid is a microemulsion comprising a polar fluid, a non-polar fluid, and a surfactant.

Embodiment 17

The method of any of the proceeding embodiments, wherein the pre-flush fluid injected into the well comprises in-situ emulsion-forming components which include a surfactant, a polar fluid, and optionally a co-solvent, and a co-surfactant.

Embodiment 18

The method of any of the proceeding embodiments, wherein the surfactant comprises non-ionic surfactants, anionic surfactants, cationic surfactants, amphoteric surfactants, extended surfactants containing a non-ionic spacer-arm central extension and an ionic or nonionic polar group, or a combination comprising at least one of the foregoing, the nonionic surfactants comprising alkyl polyglycosides, sorbitan esters, methyl glucoside esters, polyglycol esters, or alcohol ethoxylates; the anionic surfactants comprising alkali metal alkyl sulfates, alkyl or alkylaryl sulfonates, linear or branched alkyl ether sulfates and sulfonates, alcohol polypropoxylated sulfates, alcohol polyethoxylated sulfates, alkyl or alkylaryl disulfonates, alkyl disulfates, alkyl sulphosuccinates, alkyl ether sulfates, linear and branched ether sulfates; and the cationic surfactants comprising arginine methyl esters, alkanolamines, and alkylenediamides, and the extended surfactants having propoxylated or ethoxylated spacer arms.

Embodiment 19

The method of any of the proceeding embodiments, wherein the foamer composition comprises a silicone surfactant and an additive comprising one or more of the following: a diluent; a foamer solvent; or a second foamer surfactant different from the silicone surfactant.

Embodiment 20

The method of any of the proceeding embodiments further comprising recovering the wellbore fluid in a foamed state.

Embodiment 21

The method of any of the proceeding embodiments, wherein the pre-flush fluid and the foamer composition are injected via an umbilical, capillary string, gas lift, an annulus for wells without a packer, or a combination comprising at least one of the foregoing.

Embodiment 22

The method of any of the proceeding embodiments, wherein the pre-flush fluid and the foamer composition are applied in a batch treatment.

Embodiment 23

The method of any of the proceeding embodiments, wherein the pre-flush fluid and the foamer composition are applied in a continuous treatment.

Embodiment 24

A method of mitigating liquid loading in an oil well penetrating a subterranean formation, the method comprising: injecting into the oil well a pre-flush fluid to increase water wettability of the oil well, the subterranean formation, a flowline, or a combination comprising at least one of the foregoing, the pre-flush fluid being a single phase fluid, a microemulsion, or a combination thereof; injecting a foamer composition into the oil well subsequent to injecting the pre-flush fluid; and injecting a lift gas into the well or using a naturally occurring gas in the well to remove a wellbore fluid out of the well.

Embodiment 25

The method of any of the proceeding embodiments, wherein the pre-flush fluid is a single phase fluid comprising: about 5 to about 40 wt % of a solvent; about 5 to about 25 wt % of a surfactant; about 5 to about 30 wt % of a co-solvent; each based on a total weight of the pre-flush fluid, the surfactant comprising: nonionic surfactants having an HLB between about 9 and about 14, anionic surfactants selected from the group comprising oxyalkylated ether sulfates, alkyl aryl sulfates, disulfonates, sulfosuccinates, sulfonates, carboxylates, or a combination comprising at least one of the foregoing, cationic surfactants, gemini surfactants, betaines, amino-acids, or a combination comprising at least one of the foregoing; the solvent comprising an aromatic solvent, aliphatic solvent, or a combination comprising at least one of the foregoing; and the co-solvent comprising glycol ethers, methyl 2-pyrrolidone, methanol, isopropyl alcohol, butanol, pentanol, hexanol, isooctyl alcohol and their isomers, blends of $C_{1-8}$ alcohols, or a combination comprising at least one of the foregoing.

Embodiment 26

The method of any of the proceeding embodiments, wherein the pre-flush fluid is a microemulsion formed above the well or in-situ in the well.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of enhancing oil or gas production, the method comprising:
  injecting into a well penetrating a subterranean formation, a pre-flush fluid to increase water wettability of the well, the subterranean formation, a flowline, or a combination comprising at least one of the foregoing; and
  injecting into the well a foamer composition comprising a silicone surfactant and an additive comprising one or more of the following: a diluent; a foamer solvent; or a second foamer surfactant different from the silicone surfactant,
  wherein the pre-flush fluid comprises:
  about 5 to about 40 wt % of a solvent which comprises an aromatic solvent;
  about 5 to about 25 wt % of a surfactant which comprises a blend of polyoxyalkylene sulfate and alcohol ethoxylate;
  about 5 to about 30 wt % of a co-solvent which comprises glycol ether, an aliphatic alcohol, or a combination thereof; and
  about 40 wt % to about 60 wt % of a brine,
  each based on a total weight of the pre-flush fluid,
  wherein the pre-flush fluid is a single phase fluid prior to being injected into the well.

2. The method of claim 1, wherein the foamer composition is injected after the pre-flush fluid.

3. The method of claim 1, wherein the foamer composition contacts the wellbore fluid in the well to decrease the density of a wellbore fluid.

4. The method of claim 1, further comprising conveying a wellbore fluid out of the well.

5. The method of claim 4, wherein the wellbore fluid is conveyed out of the well together with a lift gas.

6. The method of claim 5, wherein the lift gas is injected into the well and comprises air, carbon dioxide, methane, ethane, propane, nitrogen, or a combination comprising at least one of the foregoing.

7. The method of claim 5, wherein the lift gas is naturally occurring and comprises carbon dioxide, natural gas, or a combination comprising at least one of the foregoing.

8. The method of claim 4, wherein the wellbore fluid is a crude oil.

9. The method of claim 4, wherein the wellbore fluid has an API density of equal to or less than 45.

10. The method of claim 4, wherein the wellbore fluid has an API density of greater than 45 and up to 55.

11. The method of claim 4, wherein the wellbore fluid has a water cut of equal to or less than 75%.

12. The method of claim 4, wherein the wellbore fluid is conveyed out of the well in a foamed state.

13. The method of claim 1, wherein the pre-flush fluid and the foamer composition are injected via an umbilical, capillary string, gas lift, an annulus for wells without a packer, or a combination comprising at least one of the foregoing.

14. The method of claim 1, wherein the pre-flush fluid and the foamer composition are applied in a batch treatment.

15. The method of claim 1, wherein the pre-flush fluid and the foamer composition are applied in a continuous treatment.

16. A method of mitigating liquid loading in an oil well penetrating a subterranean formation, the method comprising:
  injecting into the oil well, a pre-flush fluid to increase water wettability of the oil well, the subterranean formation, a flowline, or a combination comprising at least one of the foregoing;
  injecting a foamer composition into the oil well subsequent to injecting the pre-flush fluid, the foamer composition comprising a silicone surfactant and an additive comprising one or more of the following: a diluent; a foamer solvent; or a second foamer surfactant different from the silicone surfactant; and
  injecting a lift gas into the well or using a naturally occurring gas in the well to remove a wellbore fluid out of the well,
  wherein the pre-flush fluid comprises:
  about 5 to about 40 wt % of a solvent which comprises an aromatic solvent;
  about 5 to about 25 wt % of a surfactant which comprises a blend of polyoxyalkylene sulfate and alcohol ethoxylate;
  about 5 to about 30 wt % of a co-solvent which comprises glycol ether, an aliphatic alcohol, or a combination thereof; and
  about 40 wt % to about 60 wt % of a brine,
  each based on a total weight of the pre-flush fluid,
  wherein the pre-flush fluid is single phase fluid prior to being injected into the well.

* * * * *